(12) United States Patent
Chae et al.

(10) Patent No.: US 10,617,493 B2
(45) Date of Patent: Apr. 14, 2020

(54) DETACHABLE IMPLANT-COUPLING PROSTHESIS

(71) Applicants: Heejin Chae, Busan (KR); Yunja Kim, Busan (KR); Jeju Dentist Credit Union, Jeju-si (KR)

(72) Inventors: Heejin Chae, Busan (KR); Yunja Kim, Busan (KR)

(73) Assignees: Chae Heejin, Busan (KR); Kim Yunja, Busan (KR); JEJU DENTIST CREDIT UNION, Jeju-si (KR)

( * ) Notice: Subject to any disclaimer, the term of this patent is extended or adjusted under 35 U.S.C. 154(b) by 0 days.

(21) Appl. No.: 16/077,534

(22) PCT Filed: Feb. 23, 2017

(86) PCT No.: PCT/KR2017/001990
§ 371 (c)(1),
(2) Date: Aug. 13, 2018

(87) PCT Pub. No.: WO2017/146478
PCT Pub. Date: Aug. 31, 2017

(65) Prior Publication Data
US 2019/0029780 A1 Jan. 31, 2019

(30) Foreign Application Priority Data

Feb. 25, 2016 (KR) .................. 10-2016-0022364

(51) Int. Cl.
*A61C 8/00* (2006.01)
(52) U.S. Cl.
CPC .............. *A61C 8/0066* (2013.01); *A61C 8/00* (2013.01); *A61C 8/005* (2013.01); *A61C 8/0037* (2013.01);
(Continued)

(58) Field of Classification Search
CPC ....... A61B 17/84; A61B 17/86; A61C 8/0066; A61C 8/00; A61C 8/0037; A61C 8/0048;
(Continued)

(56) References Cited

U.S. PATENT DOCUMENTS

| 5,049,072 A * | 9/1991 | Lueschen ............. A61C 8/0086 433/173 |
| 7,066,736 B2 * | 6/2006 | Kumar ................. A61C 8/0001 433/172 |

(Continued)

FOREIGN PATENT DOCUMENTS

| KR | 10-2008-0104624 A | 12/2008 |
| KR | 10-2011-0019708 A | 2/2011 |

(Continued)

*Primary Examiner* — Nicholas D Lucchesi
(74) *Attorney, Agent, or Firm* — Korus Patent, LLC; Seong Il Jeong

(57) ABSTRACT

The present invention relates to a detachable implant-coupling prosthesis, and more specifically to a detachable implant-coupling prosthesis which enables an implant and a coupling prosthesis to be easily coupled to each other and can be easily coupled to and separated from each other during revision and re-placement. According to the present invention, via the unique distinguishing structure capable of achieving easy coupling without using a screw fastening method screw fastening method, loosening and fracture do not occur, and an aesthetic effect and durability can be prevented from being degraded because it is not necessary to form a hole in a tooth. Furthermore, the coupling prosthesis can be easily separated without destructing a tooth when a problem occurs after the placement of an implant, and thus effects arise in that the inconvenience of a patient can be mitigated and cost can be reduced during the treatment of inflammation or periodontitis.

3 Claims, 13 Drawing Sheets

(52) U.S. Cl.
CPC .......... *A61C 8/0048* (2013.01); *A61C 8/0062* (2013.01); *A61C 8/0068* (2013.01); *A61C 8/0093* (2013.01)

(58) Field of Classification Search
CPC ..... A61C 8/005; A61C 8/0062; A61C 8/0068; A61C 8/0093; A61C 8/0065; A61C 13/265; A61C 13/2656; A61C 13/277
See application file for complete search history.

(56) References Cited

U.S. PATENT DOCUMENTS

| | | | | |
|---|---|---|---|---|
| 7,211,086 | B2* | 5/2007 | Biedermann | A61B 17/7032 606/308 |
| 7,875,065 | B2* | 1/2011 | Jackson | A61B 17/7035 606/305 |
| 9,931,181 | B2* | 4/2018 | Allen | A61C 8/0053 |
| 2003/0125741 | A1* | 7/2003 | Biedermann | A61B 17/7032 606/278 |
| 2004/0236330 | A1* | 11/2004 | Purcell | A61B 17/7038 606/266 |
| 2006/0089644 | A1* | 4/2006 | Felix | A61B 17/7037 606/250 |
| 2009/0163962 | A1* | 6/2009 | Dauster | A61B 17/7032 606/305 |
| 2012/0277800 | A1* | 11/2012 | Jackson | A61B 17/7037 606/265 |
| 2012/0303064 | A1* | 11/2012 | Walker | A61B 17/7037 606/270 |
| 2016/0287357 | A1* | 10/2016 | Chae | A61C 8/0048 |
| 2017/0112598 | A1* | 4/2017 | Suttin | A61C 8/0001 |
| 2018/0147037 | A1* | 5/2018 | Kim | A61C 8/00 |
| 2019/0076221 | A1* | 3/2019 | Valverde | A61C 8/0075 |

FOREIGN PATENT DOCUMENTS

| | | |
|---|---|---|
| KR | 10-2014-0043336 A | 4/2014 |
| KR | 10-1386560 B1 | 4/2014 |
| KR | 10-1548805 B1 | 8/2015 |

* cited by examiner

DETACHABLE IMPLANT-COUPLING PROSTHESIS

TECHNICAL FIELD

The present invention relates to a detachable implant-coupling prosthesis, and more specifically to a coupling prosthesis configured to be coupled to a placed implant, i.e., a detachable implant-coupling prosthesis designed to be detachable such that an implant and a coupling prosthesis can be easily coupled to and separated from each other during revision and re-placement.

BACKGROUND ART

A tooth implant is a fixture which is placed in or on the jawbone for restoring a missing tooth.

A tooth implant is usually called an artificial tooth or third tooth which is placed in the gums and the gum bone.

Implantation is a dental treatment technique designed to recover the function of a natural tooth by placing a biocompatible implant body into the jaw bone the volume of which has been increased by applying an additional operation, such as bone graft, distraction osteogenesis, or the like, to the jaw bone where a tooth is defective or extracted.

After osseointegration, i.e., the morphological, physiological, and direct coupling between the jawbone, in which a normal function is maintained, and the surface of the body of the placed implant, has been achieved, the bone is subjected to the process of revising the jaw bone around the implant.

Such implants are generally used in the form of screw-shaped bone implants, and the upper structures (abutment) of the implants are fastened by screws.

As described above, in the conventional method of perform fastening by means of a screw fastening method, there are cases where a screw is loosened or cut.

Furthermore, an aesthetic effect and durability are degraded because a hole must be formed in a tooth in order to fasten the tooth to an implant, and a tooth (a crown, or metal) must be destructed when a problem occurs after the placement of an implant.

The conventional method of performing fastening by means of a screw fastening method is problematic in that it causes inconvenience to patients due to additional cost and the time spent for additional treatment and placement, inconvenience is caused in that an adhesive must be applied in an oral cavity during the coupling of a crown and a coupling structure to each other, and inflammation and periodontitis are often caused by a residual adhesive.

In order to solve this problem, the present invention provides a prosthesis in which, via the unique distinguishing structure capable of achieving easy coupling without using a screw fastening method screw fastening method, loosening and fracture do not occur, and an aesthetic effect and durability can be prevented from being degraded because it is not necessary to form a hole in a tooth.

Furthermore, there has been developed a detachable implant-coupling prosthesis which can be easily separated without destructing a tooth when a problem occurs after the placement of an implant, thereby removing the inconvenience of patients.

DISCLOSURE

Technical Problem

The present invention has been conceived to overcome the above-described problems, and an object of the present invention is to provide a detachable implant-coupling prosthesis in which, in order to overcome a screw loosening phenomenon and a screw cutting phenomenon generated due to a conventionally used screw fastening method, to overcome the disadvantage in which an aesthetic effect and durability are degraded because a hole must be formed in a tooth in order to fasten the tooth to an implant, and to overcome the disadvantage in which a tooth (a crown, or a metal) must be destructed when a problem occurs after the placement of an implant, a coupling prosthesis without loosening and fracture is provided via a unique distinguishing structure capable of achieving easy coupling without using a screw fastening method and the coupling prosthesis can be easily separated without destructing a tooth when a problem occurs after the placement of an implant.

Technical Solution

In order to accomplish the above object, the technical solution of the present invention is proposed, as follows:

The technical problem of the present invention is solved by a detachable implant-coupling prosthesis coupled to an implant (10), the detachable implant-coupling prosthesis including: an abutment (100) configured to be coupled to the top of the implant (10); and a crown-coupling structure (200) configured such that it is coupled to the top of the abutment (100) and a crown (20) is attached onto the top thereof;

wherein the abutment (100) includes: an implant coupling portion (101) configured to be coupled to the implant (10); and a crown-coupling structure (200) configured to be coupled to a coupling structure (150);

wherein a ball seat portion (151) formed by bending an upper outer circumferential surface of the abutment (100) inward is formed on the coupling structure (150);

wherein a coupling and separation tool entry part (211) formed to be penetrated in a vertical direction and configured to receive a coupling separation tool (1) in which screw threads are formed on one side thereof, a crown attachment part (210) configured such that the crown (20) is attached thereto, and an abutment coupling unit (250) configured to be coupled to the abutment (100) are formed in the crown-coupling structure (200);

wherein the abutment coupling unit (250) includes: an abutment coupling portion body (260) configured such that the coupling structure (150) is inserted thereinto; a plurality of abutment fastening balls (270); and a locking ring (280) configured such that one side thereof is cut out;

wherein coupling separation screw threads (290) formed to communicate with the coupling and separation tool entry part (211) are formed on the abutment coupling portion body (260), and a plurality of abutment fastening ball holes (261) formed to have a radius diminishing gradually in an internal direction is formed on the outer circumferential surface of the abutment coupling portion body (260);

wherein the coupling separation screw threads (290) are formed to correspond to the screw threads formed on one side of the coupling separation tool (1);

wherein the abutment fastening holes (261) accommodate the abutment fastening balls (270) accordingly; and wherein the locking ring (280) is coupled outside the plurality of abutment fastening ball holes (261) in which the abutment fastening balls (270) are accommodated, and is formed to fasten the abutment fastening balls (270) onto the ball seat portion (151) upon coupling with the abutment (100).

Advantageous Effects

The present invention provides the following effects.

In other words, via the unique distinguishing structure capable of achieving easy coupling without using a screw fastening method screw fastening method, loosening and fracture do not occur, and an aesthetic effect and durability can be prevented from being degraded because it is not necessary to form a hole in a tooth.

Furthermore, the coupling prosthesis can be easily separated without destructing a tooth when a problem occurs after the placement of an implant, and thus effects arise in that the inconvenience of a patient can be mitigated and cost can be reduced during the treatment of inflammation or periodontitis.

BEST MODE

Figure 1:
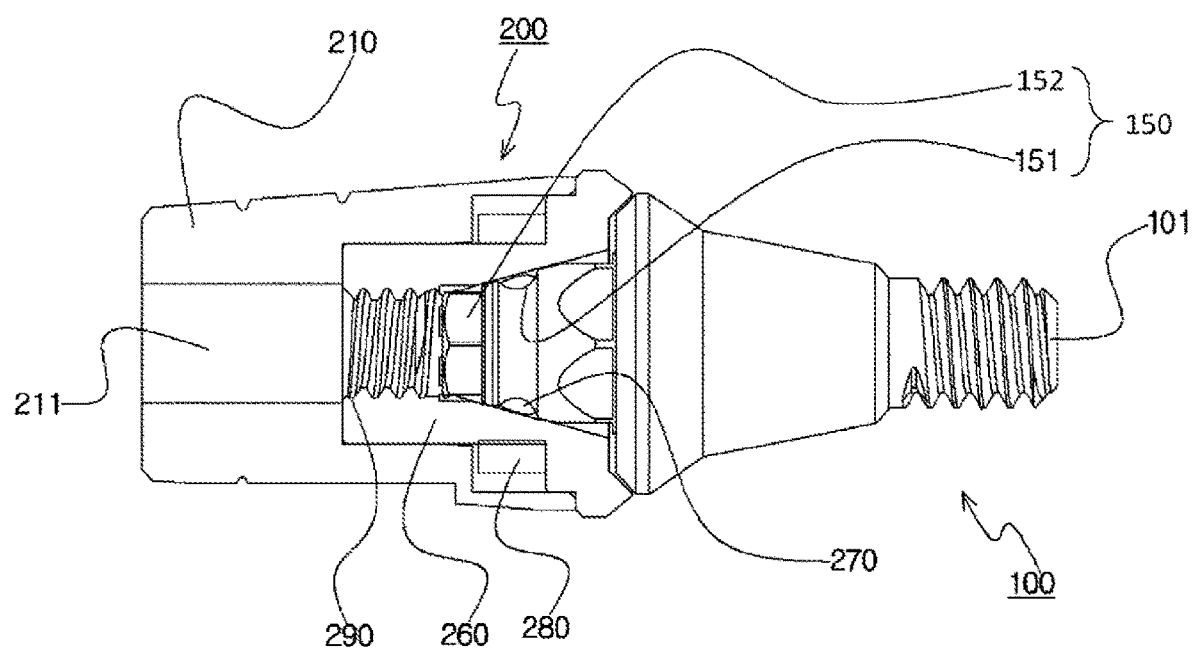
FIG. 1 is a partial sectional view showing the overall configuration of a detachable implant-coupling prosthesis according to an embodiment of the present invention.

The best solution of the invention is:

a detachable implant-coupling prosthesis coupled to an implant (10), the detachable implant-coupling prosthesis including: an abutment (100) configured to be coupled to the top of the implant (10); and a crown-coupling structure (200) configured such that it is coupled to the top of the abutment (100) and a crown (20) is attached onto the top thereof;

wherein the abutment (100) includes: an implant coupling portion (101) configured to be coupled to the implant (10); and a crown-coupling structure (200) configured to be coupled to a coupling structure (150);

wherein a ball seat portion (151) formed by bending an upper outer circumferential surface of the abutment (100) inward is formed on the coupling structure (150);

wherein a coupling and separation tool entry part (211) formed to be penetrated in a vertical direction and configured to receive a coupling separation tool (1) in which screw threads are formed on one side thereof, a crown attachment part (210) configured such that the crown (20) is attached thereto, and an abutment coupling unit (250) configured to be coupled to the abutment (100) are formed in the crown-coupling structure (200);

wherein the abutment coupling unit (250) includes: an abutment coupling portion body (260) configured such that the coupling structure (150) is inserted thereinto; a plurality of abutment fastening balls (270); and a locking ring (280) configured such that one side thereof is cut out;

wherein coupling separation screw threads (290) formed to communicate with the coupling and separation tool entry part (211) are formed on the abutment coupling portion body (260), and a plurality of abutment fastening ball holes (261) formed to have a radius diminishing gradually in an internal direction is formed on the outer circumferential surface of the abutment coupling portion body (260);

wherein the coupling separation screw threads (290) are formed to correspond to the screw threads formed on one side of the coupling separation tool (1);

wherein the abutment fastening holes (261) accommodate the abutment fastening balls (270) accordingly; and wherein the locking ring (280) is coupled outside the plurality of abutment fastening ball holes (261) in which the abutment fastening balls (270) are accommodated, and is formed to fasten the abutment fastening balls (270) onto the ball seat portion (151) upon coupling with the abutment (100).

MODE FOR INVENTION

Preferred embodiments of the present invention will be described in detail below in mode for invention with reference to the accompanying drawings.

First, it should be noted that throughout the drawings, the same components or parts are denoted by the same reference symbols as much as possible.

In the description of the present invention, detailed descriptions of related well-known functions or components will be omitted in order to prevent the gist of the present invention from being made obscure.

The terms "about," "substantially," etc. used herein are used to mean closeness to a corresponding numerical value when a unique manufacturing or material tolerance is proposed in mentioned context, and are used to prevent a scrupulous infringer from illegitimately using disclosure in which an accurate or absolute numeral value is described in order to help to understand the present invention.

First, the present invention is summarized, as follows:

In other words, the present invention is directed to a detachable implant-coupling prosthesis coupled to an implant 10, the detachable implant-coupling prosthesis including: an abutment 100 configured to be coupled to the top of the implant 10; and a crown-coupling structure 200 configured such that it is coupled to the top of the abutment 100 and a crown 20 is attached onto the top thereof; wherein the abutment 100 includes: an implant coupling portion 101 configured to be coupled to the implant 10; and a crown-coupling structure 200 configured to be coupled to a coupling structure 150; wherein a ball seat portion 151 formed by bending an upper outer circumferential surface of the abutment 100 inward is formed on the coupling structure 150; wherein a coupling and separation tool entry part 211 formed to be penetrated in a vertical direction and configured to receive a coupling separation tool 1 in which screw threads are formed on one side thereof, a crown attachment part 210 configured such that the crown 20 is attached thereto, and an abutment coupling unit 250 configured to be coupled to the abutment 100 are formed in the crown-coupling structure 200; wherein the abutment coupling unit 250 includes: an abutment coupling portion body 260 configured such that the coupling structure 150 is inserted thereinto; a plurality of abutment fastening balls 270; and a locking ring 280 configured such that one side thereof is cut out; wherein coupling separation screw threads 290 formed to communicate with the coupling and separation tool entry part 211 are formed on the abutment coupling portion body 260, and a plurality of abutment fastening ball holes 261 formed to have a radius diminishing gradually in an internal direction is formed on the outer circumferential surface of the abutment coupling portion body 260; wherein the coupling separation screw threads 290 are formed to correspond to the screw threads formed on one side of the coupling separation tool 1; wherein the abutment fastening holes 261 accommodate the abutment fastening balls 270 accordingly; and wherein the locking ring 280 is coupled outside the plurality of abutment fastening ball holes 261 in which the abutment fastening balls 270 are accommodated, and is formed to fasten the abutment fastening balls 270 onto the ball seat portion 151 upon coupling with the abutment 100. The coupling structure 150 further includes a polygonal head 152 formed on a top of the ball seat portion 151 in a polygonal shape; and a polygonal head accommodation portion 262 configured such that a plurality of depressions corresponding to the polygonal head 152 is formed is formed in the abutment coupling portion body 260, thereby preventing the crown-coupling structure 200 from being rotated after coupling with the crown-coupling structure 200. The abutment coupling unit 250 further includes a locking ring rotation prevention ball 275 configured to be located in a cutout portion of the locking ring 280; and a rotation prevention ball accommodation depression 265 corresponding to the locking ring rotation prevention ball 275 is formed in the abutment coupling portion body 260, thereby preventing the locking ring 280 from being rotated after coupling with the crown-coupling structure 200.

The present invention is directed to a detachable implant-coupling prosthesis which can overcome a screw loosening phenomenon and a screw cutting phenomenon generated due to a conventionally used screw fastening method, overcome the disadvantage in which an aesthetic effect and durability are degraded because a hole must be formed in a tooth in order to fasten the tooth to an implant, and overcome the disadvantage in which a tooth (a crown, or a metal) must be destructed when a problem occurs after the placement of an implant, which does not cause loosening and fracture via a unique distinguishing structure capable of achieving easy coupling without using a screw fastening method, and which can be easily separated without destructing a tooth when a problem occurs after the placement of an implant.

FIG. 1 is a partial sectional view showing the overall configuration of a detachable implant-coupling prosthesis according to an embodiment of the present invention.

As shown in FIG. 1, the present invention is directed to a detachable implant-coupling prosthesis, which includes: an abutment 100 configured to be coupled to an implant 10 implanted for the placement of an implant; and a crown-coupling structure 200 configured such that a crown 20 is attached thereto and it is coupled to the abutment 100.

An implant coupling portion 101 configured to be coupled to the implant 10 is formed on the abutment 100, and screw threads corresponding to those of the implant 10 are formed on the implant coupling portion 101.

The crown-coupling structure 200 is coupled to the abutment 100. In the crown-coupling structure 200, a coupling and separation tool entry part 211 is formed through the top end of the crown-coupling structure 200, and a crown attachment part 210 configured such that the crown 20 is attached thereonto is formed.

Although the crown 20 is preferably attached onto the crown attachment part 210 by using a method of attaching the crown 20 onto the outer side of crown attachment part 210 by means of an adhesive or the like, i.e., a typical method, a method of attaching the crown 20 is not limited to the method of performing attachment by using an adhesive.

The coupling portions of the abutment 100 and the crown-coupling structure 200 will be described in detail, as follows:

In FIG. 1, the coupling portions are illustrated by means of a partial sectional view in order to illustrate the coupling portions in detail.

The coupling between the abutment 100 and the crown-coupling structure 200 is achieved in such a manner that abutment fastening balls 270 are seated on a ball seat portion 151 formed on a coupling structure 150, thereby coupling the abutment 100 and the crown-coupling structure 200 to each other.

Figure 9:
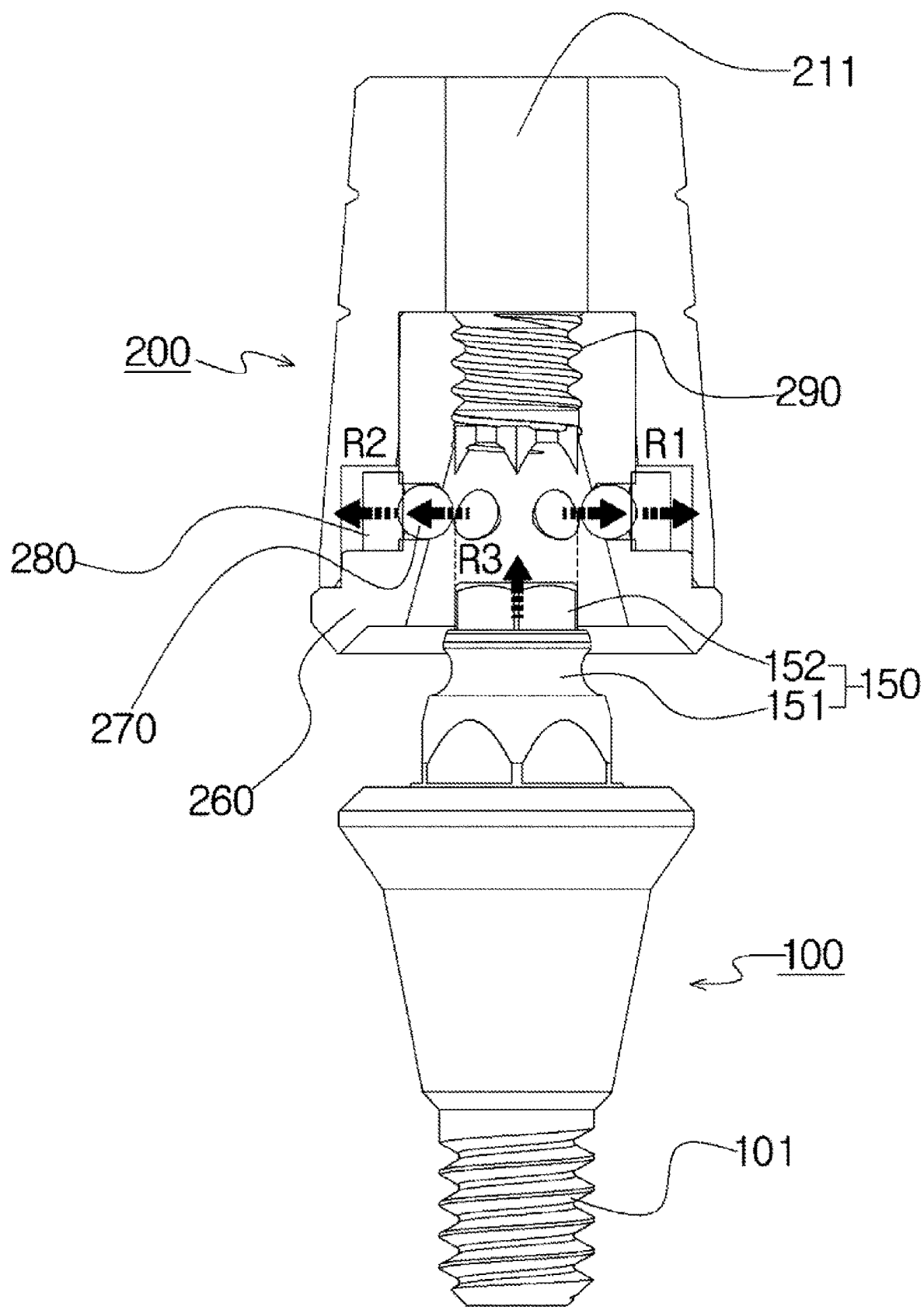
FIGS. 9 to 10 are views showing the process of coupling the abutment (100) and the crown-coupling structure (200) to each other.

As can be seen from FIG. 9, the ball seat portion 151 is formed to be formed to be concave such that the abutment fastening balls 270 can be seated thereon.

Furthermore, a locking ring 280 is formed to prevent the abutment 100 and the crown-coupling structure 200 from being separated from each other. The locking ring 280 is formed to surround the outer surface of the abutment coupling portion body 260 so that the abutment fastening balls 270 can come into tight contact with the surface of the ball seat portion 151.

Figure 2:
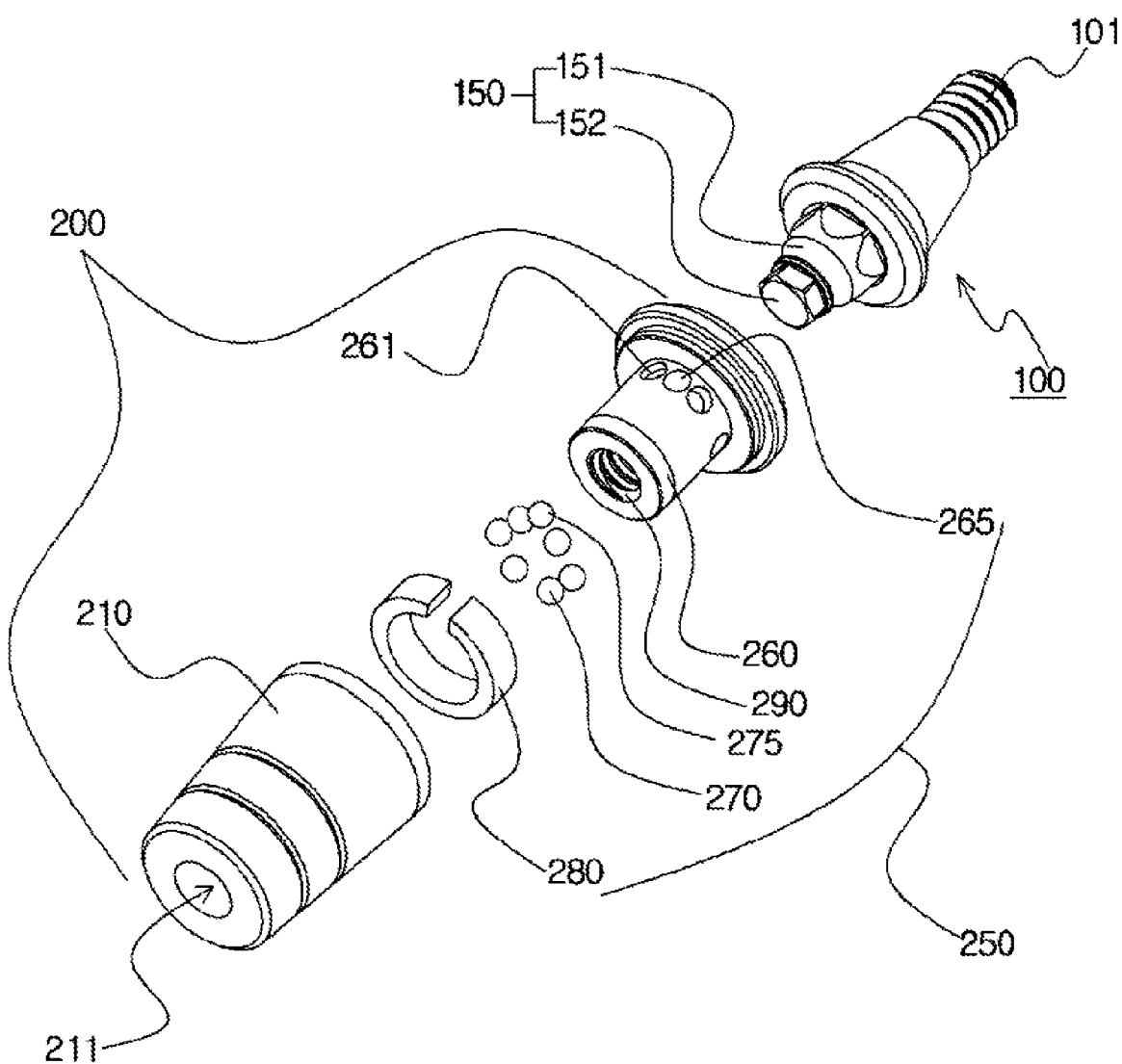
FIG. 2 is an exploded view showing the disassembled overall configuration of the detachable implant-coupling prosthesis according to the embodiment of the present invention.

FIG. 2 is an exploded view showing the overall disassembled configuration of the detachable implant-coupling prosthesis according to the embodiment of the present invention.

As shown in FIG. 2, the overall configuration of the detachable implant-coupling prosthesis is as follows:

The detachable implant-coupling prosthesis is formed by the coupling of the crown-coupling structure 200 and the abutment 100 into each other.

The crown-coupling structure 200 is formed to include the crown attachment part 210 configured such that the crown 20 is attached thereonto and an abutment coupling unit 250 configured to function to be coupled to the abutment 100.

The crown 20 is attached onto the outer circumferential surface of the crown attachment part 210, and the coupling and separation tool entry part 211 is formed through the top end of the crown attachment part 210.

Referring to FIG. 2, six abutment fastening balls 270 and one locking ring rotation prevention ball 275 are formed. The abutment fastening balls 270 are accommodated in abutment fastening ball holes 261 one by one, and the locking ring rotation prevention ball 275 is seated in a rotation prevention ball accommodation depression 265. Furthermore, the abutment fastening balls 270 may be 7 or 8 in number, and locking ring rotation prevention ball 275 may be 2 or 3 in number, and thus the numbers of the balls are not limited the above-described numbers.

More specifically, the abutment coupling unit 250 includes the abutment coupling portion body 260 configured such that the coupling structure 150 formed on the top of the abutment 100 is inserted thereinto, the plurality of abutment fastening balls 270, and the locking ring 280 configured such that one side thereof is cut out. Accordingly, the abutment fastening balls 270 and the locking ring 280 are coupled to the abutment coupling portion body 260.

Furthermore, the locking ring rotation prevention ball 275 is preferably formed in the cutout portion of the locking ring 280. The reason for this is to prevent the locking ring 280 from being rotated after being coupled.

The plurality of abutment fastening ball holes 261 having a radius diminishing in an internal direction is formed in the abutment coupling portion body 260, and accommodates the abutment fastening balls 270.

The locking ring 280 is coupled outside the plurality of abutment fastening ball holes 261 in which the abutment fastening balls 270 are accommodated, and fastens the abutment fastening balls 270 onto the ball seat portion 151 when it is coupled to the abutment 100.

The locking ring 280 is formed such that one side thereof is cut out, and thus has predetermined elasticity.

When the locking ring 280 is coupled to the abutment 100, the locking ring 280 disposed outside the abutment fastening balls 270 is slightly spread, and thus a space is formed between the abutment fastening balls 270, thereby allowing the coupling structure 150 to be inserted thereinto.

After the coupling structure 150 has been inserted, the abutment fastening balls 270 are seated on the ball seat portion 151 formed on the coupling structure 150 accordingly, and the locking ring 280 brings the abutment fastening balls 270 into close contact with the ball seat portion 151 in order to prevent easy separation.

The abutment 100 is formed to include the coupling structure 150 and the implant coupling portion 101.

The coupling structure 150 is configured such that the ball seat portion 151 formed by bending an outer circumferential surface is formed such that the abutment fastening balls 270 can be seated thereon, and a polygonal head 152 is further formed on the top of the ball seat portion 151. Although not shown, the polygonal head 152 is coupled to a polygonal head accommodation portion 262 formed inside the abutment coupling portion body 260 and including a plurality of depressions, and prevents the crown-coupling structure 200 from being rotated after being coupled to the abutment 100.

The crown-coupling structure 200 and the abutment 100 coupled to each other, as described above, may be easily separated by inserting a coupling separation tool 1 via coupling separation screw threads 290 formed inside the abutment coupling portion body 260 and the coupling and separation tool entry part 211 formed through the top of the crown attachment part 210.

In other words, the coupling separation tool 1 configured such that screw threads corresponding to the coupling separation screw threads 290 are formed on the side thereof is inserted into the coupling and separation tool entry part 211 formed to communicate with the coupling separation screw threads 290 and is then rotated, and thus the abutment 100 is pushed, thereby easily separating the abutment 100 and the crown-coupling structure 200 from each other.

The polygonal head 152 is preferably formed in a polygonal shape in order to prevent the crown-coupling structure 200 coupled to the abutment 100 from being rotated.

However, when two or more teeth are placed, the two teeth are connected to each other and are placed, and thus the prevention of rotation is not required. Accordingly, in this case, the polygonal head 152 may be formed in a circular shape or any other shape, as desired.

Figure 3:
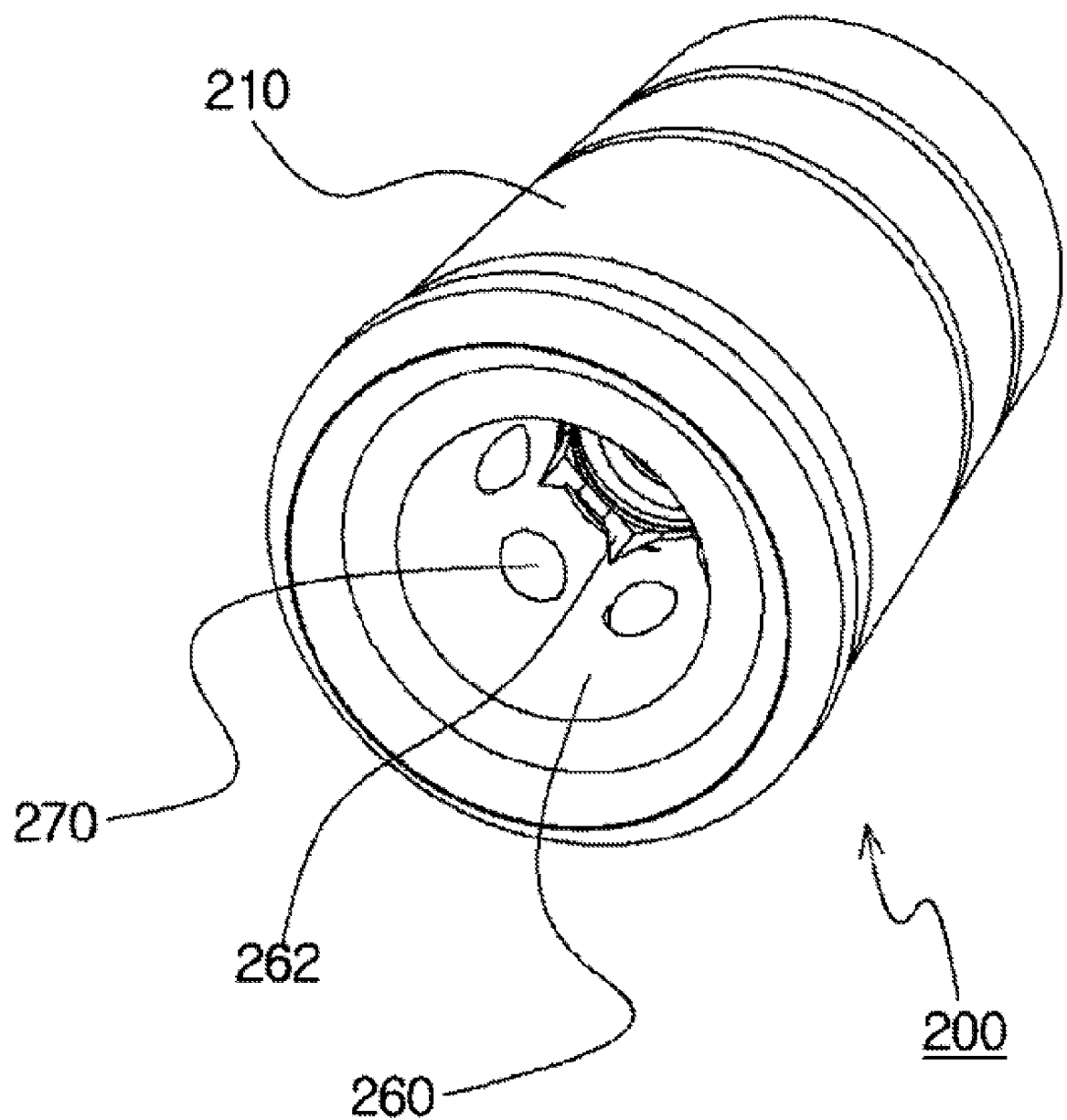
FIG. 3 is a perspective view showing the overall configuration of the crown-coupling structure (200) of the detachable implant-coupling prosthesis according to the embodiment of the present invention.

FIG. 3 is a perspective view showing the overall configuration of the crown-coupling structure 200 of the detachable implant-coupling prosthesis according to an embodiment of the present invention.

As shown in FIG. 3, the appearance of the crown-coupling structure 200 is shown when viewed from below. Via the polygonal head accommodation portion 262 formed inside the abutment coupling portion body 260 and having a plurality of depressions, the crown-coupling structure 200 is prevented from being rotated after being coupled to the abutment 100.

Figure 4:
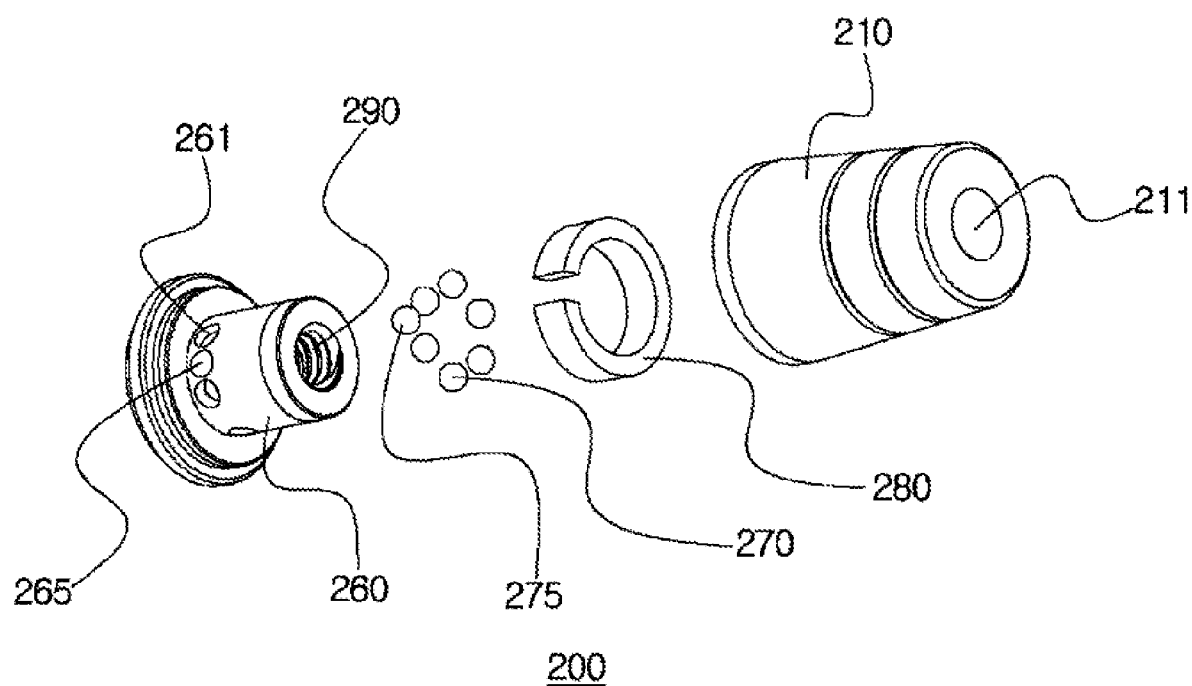
FIG. 4 is an exploded view showing the overall disassembled configuration of the crown-coupling structure (200) of the detachable implant-coupling prosthesis according to the embodiment of the present invention.

FIG. 4 is an exploded view showing the overall disassembled configuration of the crown-coupling structure 200 of the detachable implant-coupling prosthesis according to an embodiment of the present invention.

FIG. 4 shows the overall disassembled configuration of the crown-coupling structure 200.

As shown in this drawing, the locking ring rotation prevention ball 275 is disposed to be located in the cutout portion of the locking ring 280.

The locking ring rotation prevention ball 275 is seated on and fastened onto the rotation prevention ball accommodation depression 265 formed on the abutment coupling portion body 260. When the abutment coupling portion body 260 and the locking ring 280 are coupled to each other, the locking ring rotation prevention ball 275 is located in the cutout portion of the locking ring 280, and functions to prevent the locking ring 280 from being rotated.

Figure 5:
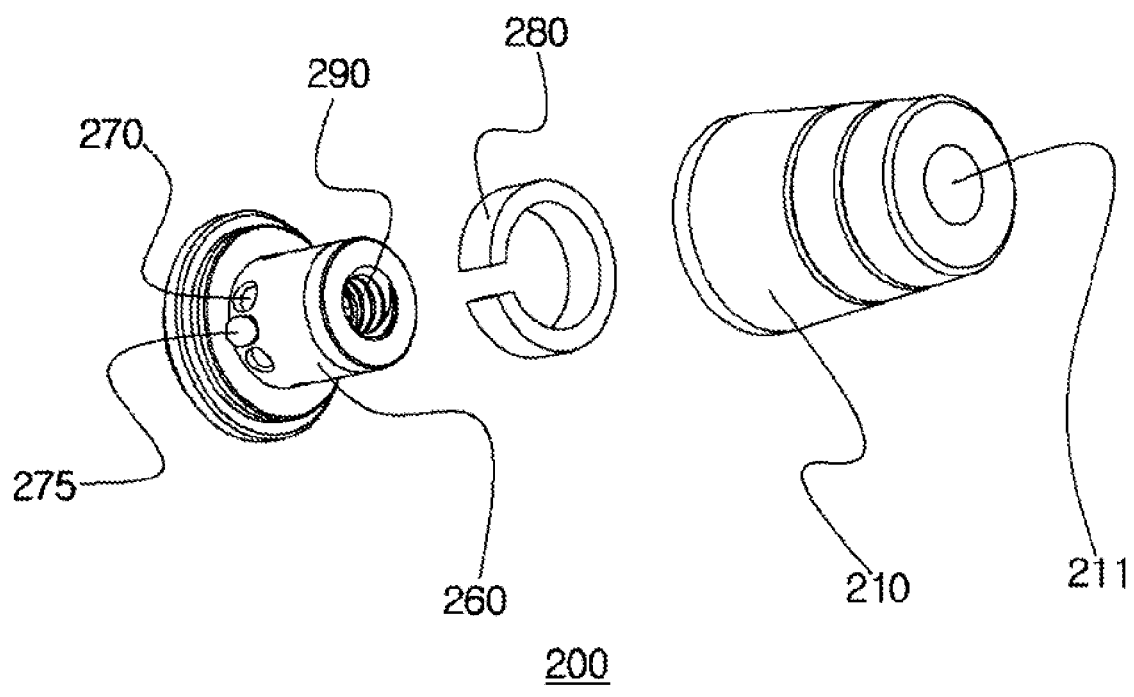
FIG. 5 is a perspective view showing a configuration in which abutment fastening balls (270) are coupled to an abutment coupling portion body (260)

FIG. 5 is a perspective view showing the crown-coupling structure 200 according to the embodiment of the present invention, i.e., a configuration in which the abutment fastening balls 270 are coupled to the abutment coupling portion body 260.

As shown in FIG. 5, the abutment fastening balls 270 are accommodated in the abutment fastening ball holes 261, and the locking ring rotation prevention ball 275 is located in the rotation prevention ball accommodation depression 256.

Figure 6:
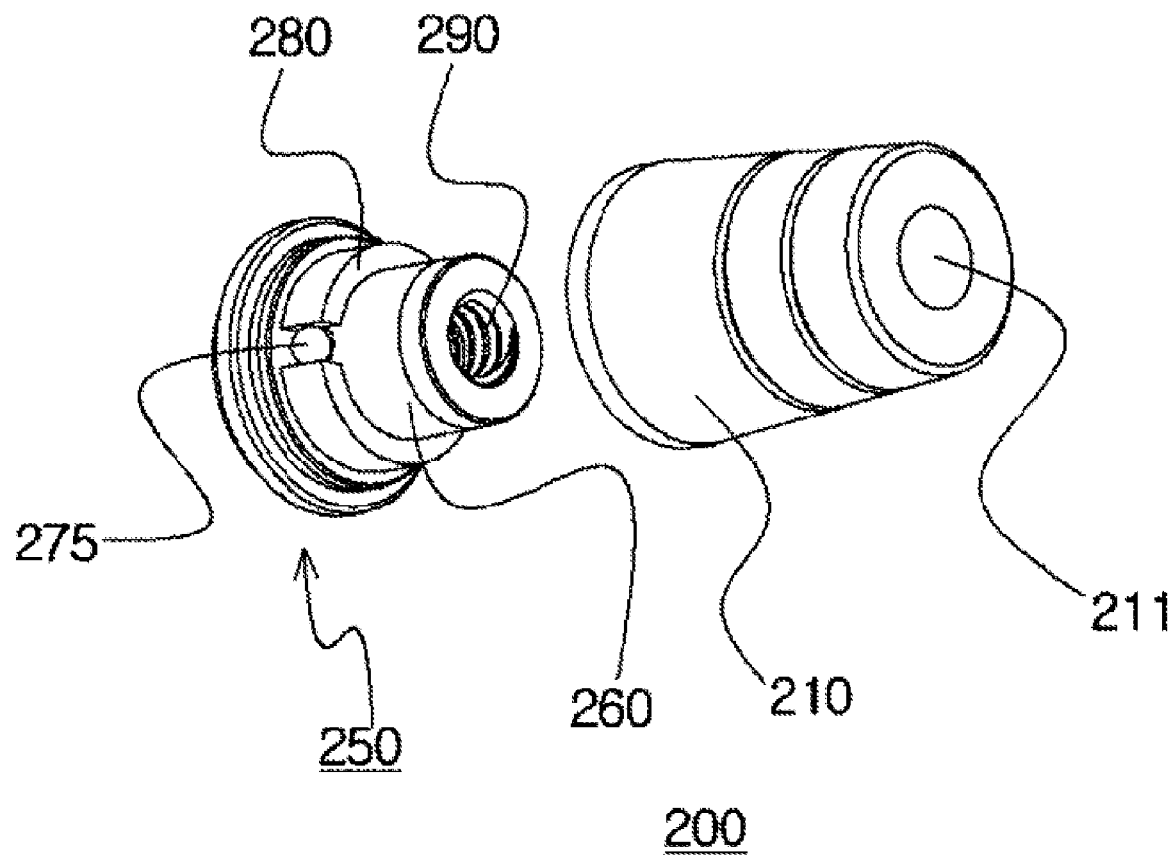
FIG. 6 is a perspective view showing a configuration in which the abutment fastening balls (270) and a locking ring (280) are coupled to the abutment coupling portion body (260) according to an embodiment of the present invention.

FIG. 6 is a perspective view showing a configuration in which the abutment fastening balls 270 and the locking ring 280 are coupled to the abutment coupling portion body 260 according to an embodiment of the present invention.

As shown in FIGS. 5 and 6, the locking ring 280 is coupled to the outer surface of the abutment coupling portion body 260 on which the abutment fastening ball holes 261 and the rotation prevention ball accommodation depressions 265 in which the abutment fastening balls 270 are accommodated are located, and the locking ring rotation prevention ball 275 is coupled into the cutout portion of the locking ring 280.

Figure 7:
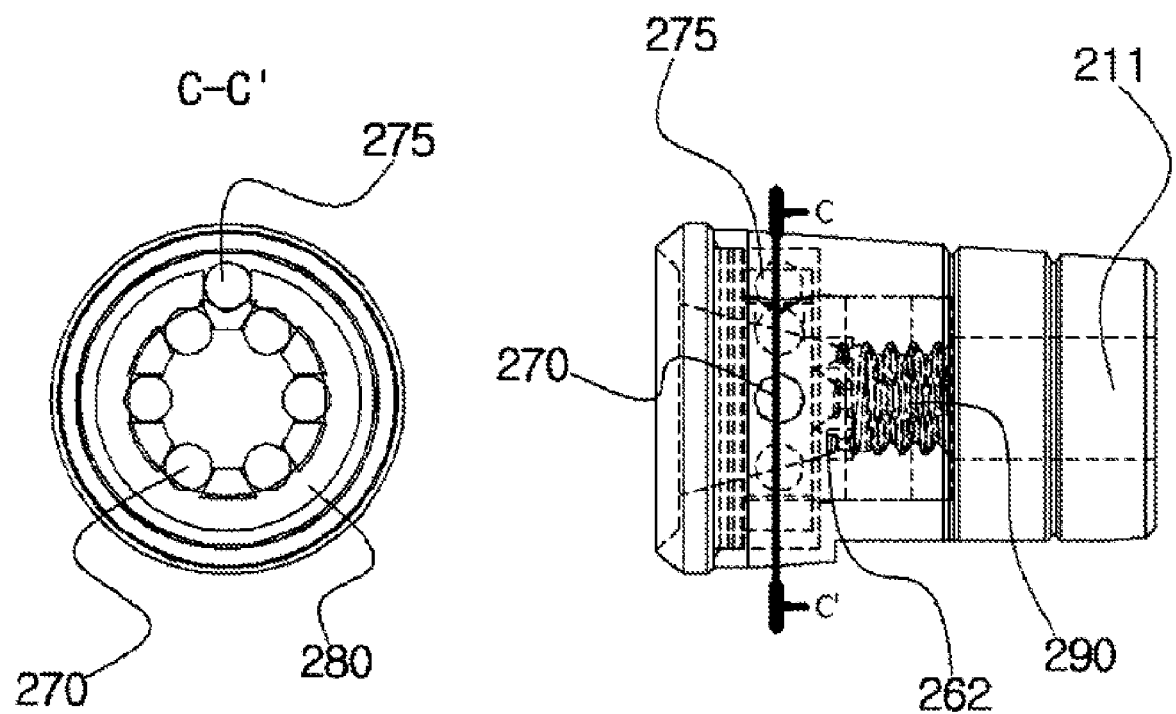
FIG. 7 is a sectional view showing a cut surface obtained by cutting a crown-coupling structure (200) in direction C.

FIG. 7 is a sectional view showing a cut surface obtained by cutting the crown-coupling structure 200 according to an embodiment of the present invention in direction C.

As shown in FIG. 7, an internal cut surface obtained by cutting the crown-coupling structure 200 in the direction C is shown. FIG. 7 showing the coupling relationship between the abutment fastening ball holes 261, the abutment fastening balls 270, the locking ring rotation prevention ball 275, and the locking ring 280.

Figure 8:
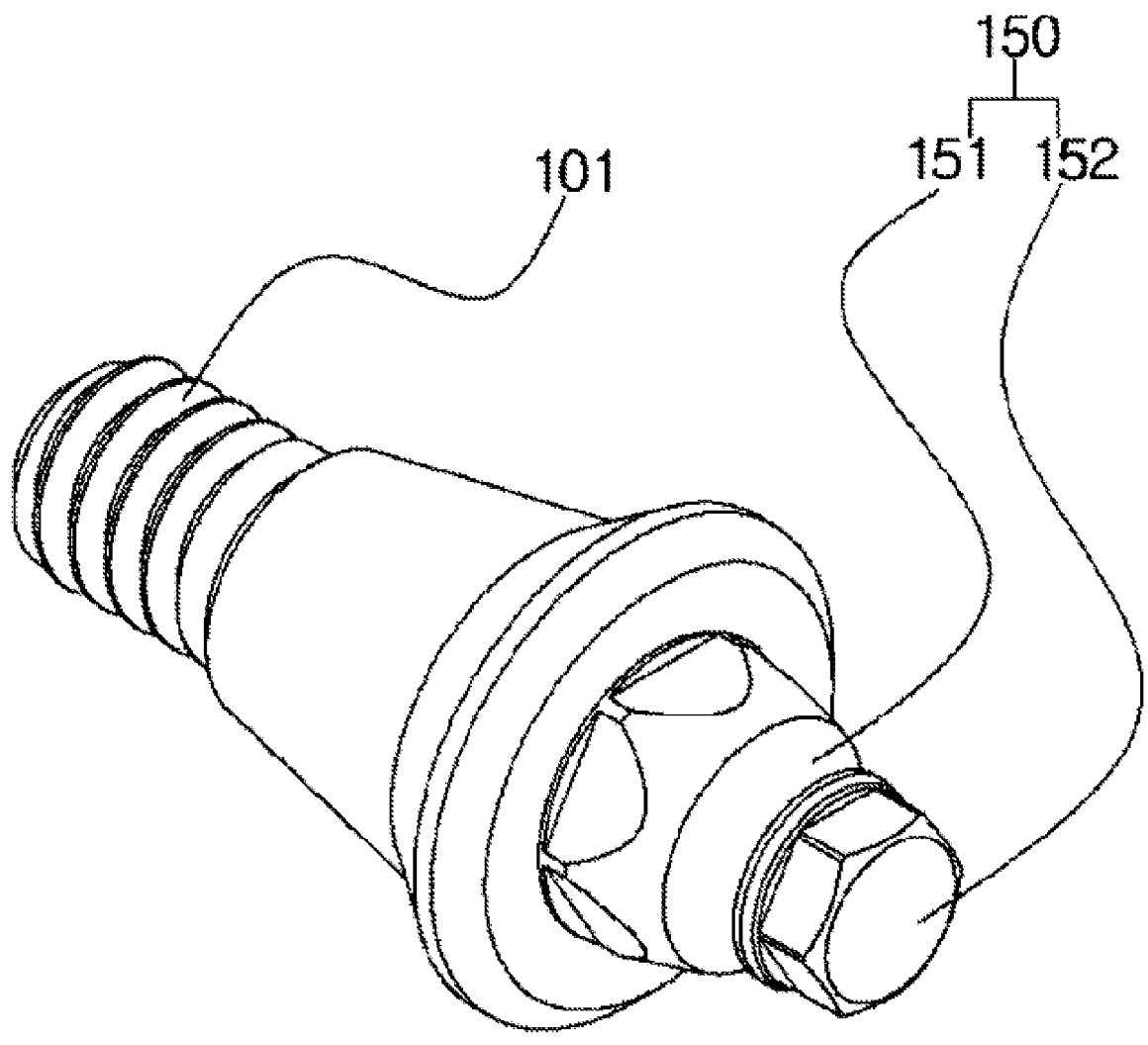
FIG. 8 is a perspective view showing the overall configuration of an abutment (100) according to an embodiment of the present invention.

FIG. 8 is a perspective view showing the overall configuration of the abutment 100 according to an embodiment of the present invention.

As shown in FIG. 8, the abutment 100 includes the implant coupling portion 101 configured to be coupled to the implant 10, and the coupling structure 150 configured to be coupled to the crown-coupling structure 200. In the coupling structure 150, the ball seat portion 151 formed by bending the outer circumferential surface is formed in the upper portion of the abutment 100, and the polygonal head 152 is formed on the top of the ball seat portion 151.

Figure 10:
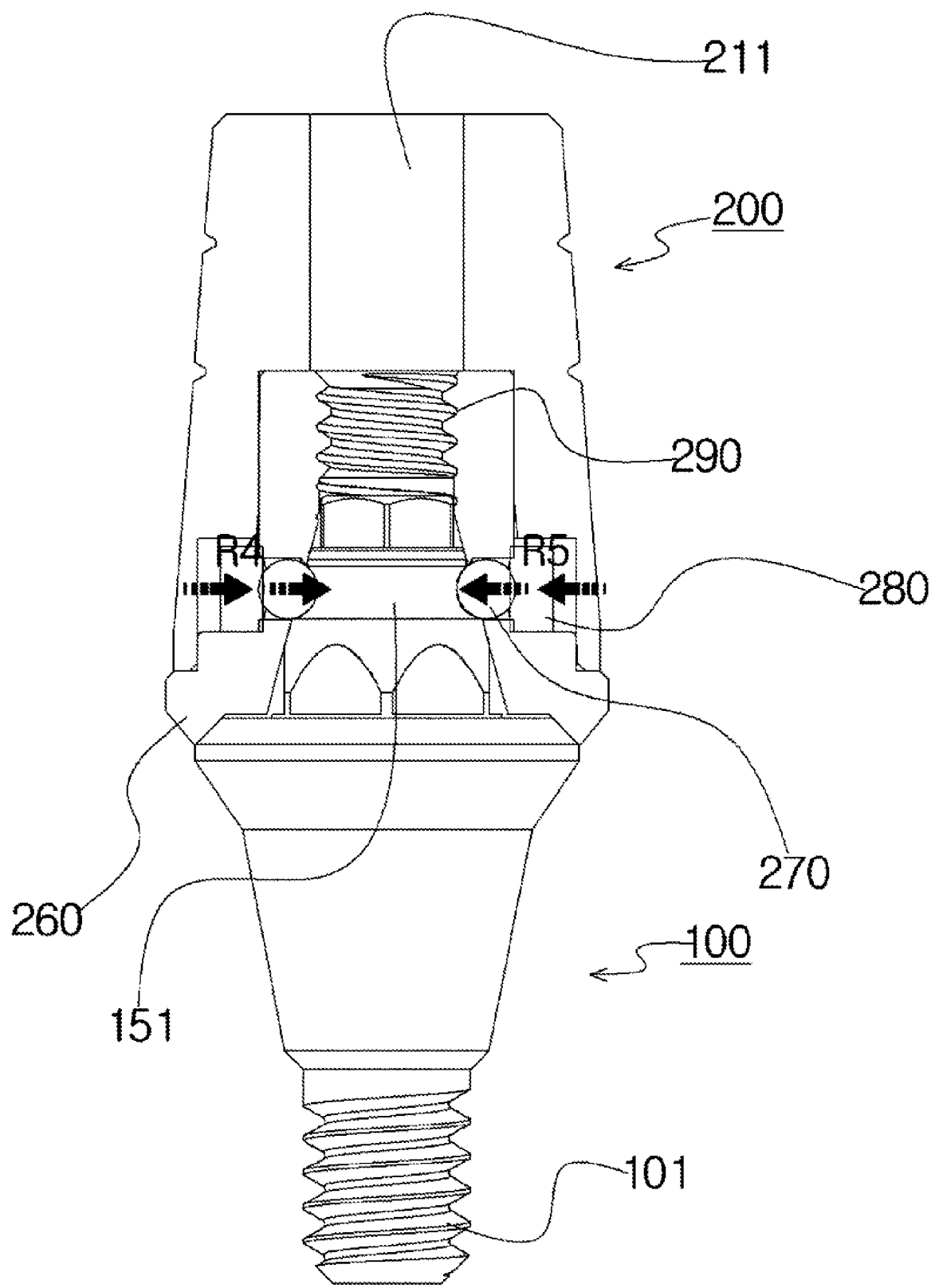

FIGS. 9 to 10 are views showing the process of coupling the abutment 100 and the crown-coupling structure 200 to each other.

The process of coupling the abutment 100 and the crown-coupling structure 200 to each other is performed, as follows:

The upper portion of the abutment 100, i.e., the coupling structure 150, is inserted in direction R3 toward the bottom of the abutment coupling portion body 260 in the crown-coupling structure 200.

In this case, the coupling structure 150 is coupled while pushing the abutment fastening balls 270 in directions R1 and R2.

The abutment fastening balls 270 pushed in the directions R1 and R2 move back in directions R4 and R5 by the elasticity of the locking ring 280. During this process, the abutment fastening balls 270 are accommodated in and fastened onto the ball seat portion 151 formed on the abutment 100.

Via this structure, easy coupling is enabled.

Figure 11:
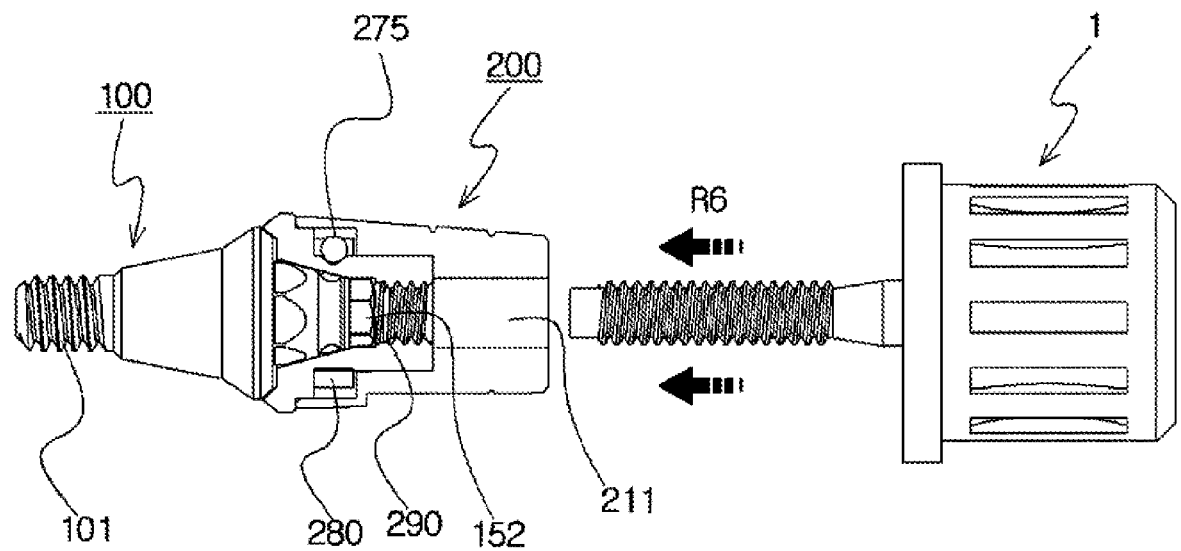
FIGS. 11 to 13 are views showing the process of separating the abutment (100) and the crown-coupling structure (200) from each other.
Figure 12:
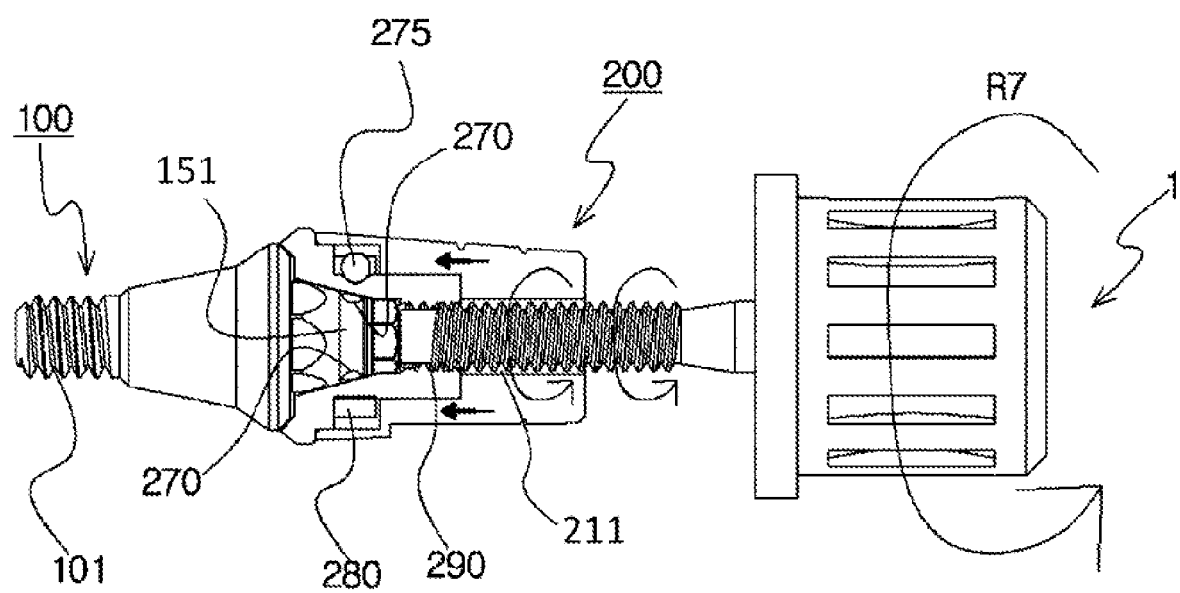
Figure 13:
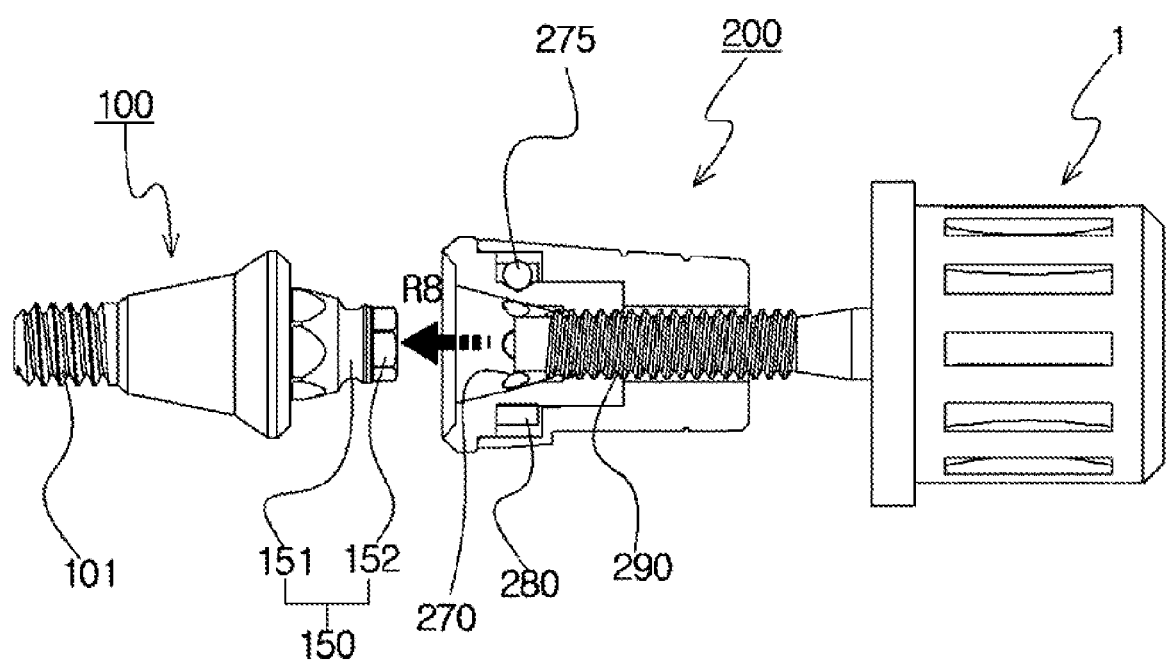

FIGS. 11 to 13 are views showing the process of separating the abutment 100 and the crown-coupling structure 200 from each other.

The process of separating the abutment 100 and the crown-coupling structure 200 from each other abutment 100 crown-coupling structure 200 is performed, as follows:

The abutment 100 and the crown-coupling structure 200 coupled to each other are preferably separated using the coupling separation tool 1 configured such that the screw threads are formed one side thereof.

The screw threads of the coupling separation tool 1 are formed to correspond to the coupling separation screw threads 290 formed on the abutment coupling portion body 260, and a grip which is easy to grip and rotate is preferably formed on the other side of the coupling separation tool 1.

The reason for this is to easily separate the abutment 100 and the crown-coupling structure 200 by rotating the coupling separation tool 1.

The coupling separation tool 1 is inserted into the coupling and separation tool entry part 211, i.e., in direction R6 (see FIG. 11), and the screw threads of the coupling separation tool 1 are brought into contact with the coupling separation screw threads 290 and are then rotated in direction R7 (see FIG. 12).

In this case, the coupling separation tool 1 is engaged with the coupling separation screw threads 290, and simultaneously pushes the upper portion of the abutment 100, i.e., the polygonal head 152.

Accordingly, the abutment 100 is pushed in direction R8 (see FIG. 13), and thus the coupling of the crown-coupling structure 200 and the abutment 100 is easily released.

Figure 14:
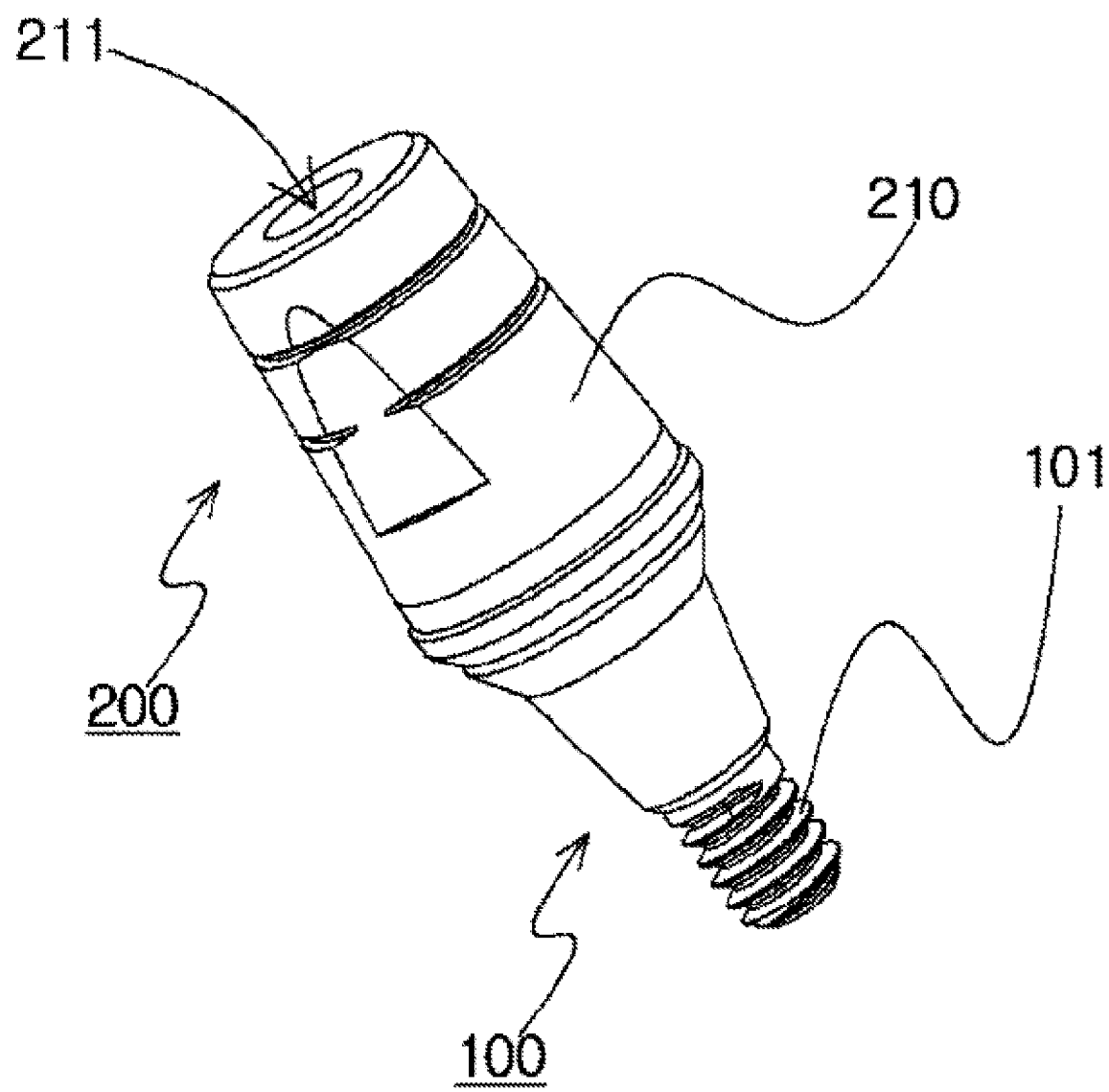
FIG. 14 is a perspective view showing the overall configuration of the detachable implant-coupling prosthesis according to the embodiment of the present invention.

FIG. 14 is a perspective view showing the overall configuration of the detachable implant-coupling prosthesis according to the embodiment of the present invention.

FIG. 14 is a perspective view showing the assembled detachable implant-coupling prosthesis.

Figure 15:
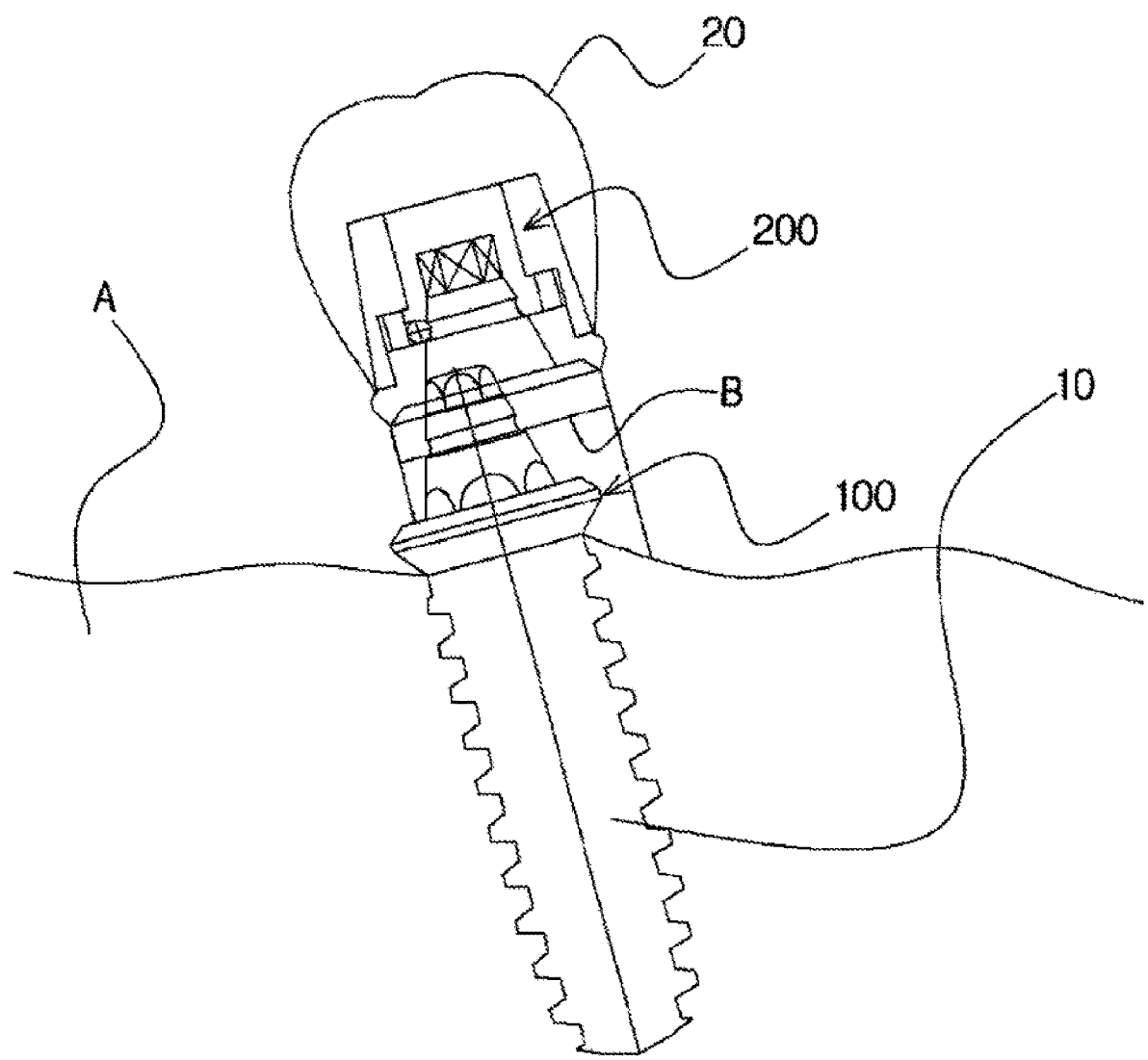
FIG. 15 is a view showing a scene of the placement of the crown-coupling structure (200) onto which the crown (20) has been attached.

FIG. 15 is a view showing a scene of the placement of the crown-coupling structure 200 onto which the crown 20 has been attached.

As shown in FIG. 15, the abutment 100 is coupled to the implant 10 implanted into gums A, and the crown-coupling structure 200 onto which the crown is attached is coupled to the top of the abutment 100.

This method enables fastening to be performed by easy pressing, unlike conventional technology in which placement is performed using a screw coupling method by rotating a crown. This method makes placement relatively simple. The coupling structure 150 may be formed in a structure which becomes narrower in a direction toward the upper portion thereof, and thus an advantage arises in that freely coupling can be performed within region B.

The above-described present invention is directed to the detachable implant-coupling prosthesis which can be easily fastened and separated via the unique distinguishing structure capable of overcoming a screw loosening phenomenon and a screw cutting phenomenon generated due to a conventionally used screw fastening method, overcoming the disadvantage in which an aesthetic effect and durability are degraded because a hole must be formed in a tooth in order to fasten the tooth to an implant, and overcoming the disadvantage in which a tooth (a crown, or a metal) must be destructed when a problem occurs after the placement of an implant, so that re-placement and revision are enabled because the detachable implant-coupling prosthesis can be easily separated without destructing a tooth when a problem occurs after the placement of an implant, so that loosening and fracture do not occur because a screw fastening method is not used, and so that high durability can be provided because it is not necessary to form a hole in a tooth.

The present invention described above is not limited by the above-described embodiment and the accompanying drawings. It will be apparent to those having ordinary knowledge in the art to which the present invention pertains that various substitutions, modifications, and alterations may be made without departing from technical spirit of the present invention.

INDUSTRIAL APPLICABILITY

The present invention relates to a detachable implant-coupling prosthesis designed to be detachable such that an implant and a coupling prosthesis can be easily coupled to and separated from each other during revision and re-placement. The coupling prosthesis can be easily separated without destructing a tooth when a problem occurs after the placement of an implant, and thus effects arise in that the inconvenience of a patient can be mitigated and cost can be reduced during the treatment of inflammation or periodontitis. The present invention is applicable to implant treatment.

The invention claimed is:

1. A detachable implant-coupling prosthesis configured to be coupled to an implant (10), the detachable implant-coupling prosthesis comprising:
   an abutment (100) configured to be coupled to a top of the implant (10); and
   a crown-coupling structure (200) configured such that it is coupled to a top of the abutment (100) and a crown (20) is attached onto a top thereof;
   wherein the abutment (100) comprises:
   an implant coupling portion (101) configured to be coupled to the implant (10); and
   a crown-coupling structure (200) configured to be coupled to a coupling structure (150);

wherein a ball seat portion (151) formed by bending an upper outer circumferential surface of the abutment (100) inward is formed on the coupling structure (150);

wherein a coupling and separation tool entry part (211) formed to be penetrated in a vertical direction and configured to receive a coupling separation tool (1) in which screw threads are formed on one side thereof, a crown attachment part (210) configured such that the crown (20) is attached thereto, and an abutment coupling unit (250) configured to be coupled to the abutment (100) are formed in the crown-coupling structure (200);

wherein the abutment coupling unit (250) comprises:

an abutment coupling portion body (260) configured such that the coupling structure (150) is inserted thereinto;

a plurality of abutment fastening balls (270); and a locking ring (280) configured such that one side thereof is cut out;

wherein:

coupling separation screw threads (290) formed to communicate with the coupling and separation tool entry part (211) are formed on the abutment coupling portion body (260); and a plurality of abutment fastening ball holes (261) formed to have a radius diminishing gradually in an internal direction is formed on an outer circumferential surface of the abutment coupling portion body (260);

wherein the coupling separation screw threads (290) are formed to correspond to the screw threads formed on one side of the coupling separation tool (1);

wherein the abutment fastening ball holes (261) accommodate the abutment fastening balls (270) accordingly; and wherein the locking ring (280):

is coupled outside the plurality of abutment fastening ball holes (261) in which the abutment fastening balls (270) are accommodated; and is formed to fasten the abutment fastening balls (270) onto the ball seat portion (151) upon coupling with the abutment (100).

2. The detachable implant-coupling prosthesis of claim 1, wherein:

the coupling structure (150) further comprises a polygonal head (152) formed on a top of the ball seat portion (151) in a polygonal shape; and a polygonal head accommodation portion (262) configured such that a plurality of depressions corresponding to the polygonal head (152) is formed in the abutment coupling portion body (260), thereby preventing the crown-coupling structure (200) from being rotated after coupling with the crown-coupling structure (200).

3. The detachable implant-coupling prosthesis of claim 1 or 2, wherein:

the abutment coupling unit (250) further comprises a locking ring rotation prevention ball (275) configured to be located in a cutout portion of the locking ring (280); and a rotation prevention ball accommodation depression (265) corresponding to the locking ring rotation prevention ball (275) is formed in the abutment coupling portion body (260), thereby preventing the locking ring (280) from being rotated after coupling with the crown-coupling structure (200).

* * * * *